Jan. 11, 1938.     W. S. SAUNDERS     2,104,769
STORAGE BATTERY INSTALLATION
Filed Aug. 21, 1936     2 Sheets-Sheet 1

INVENTOR
WALTER S. SAUNDERS
BY
ATTORNEYS

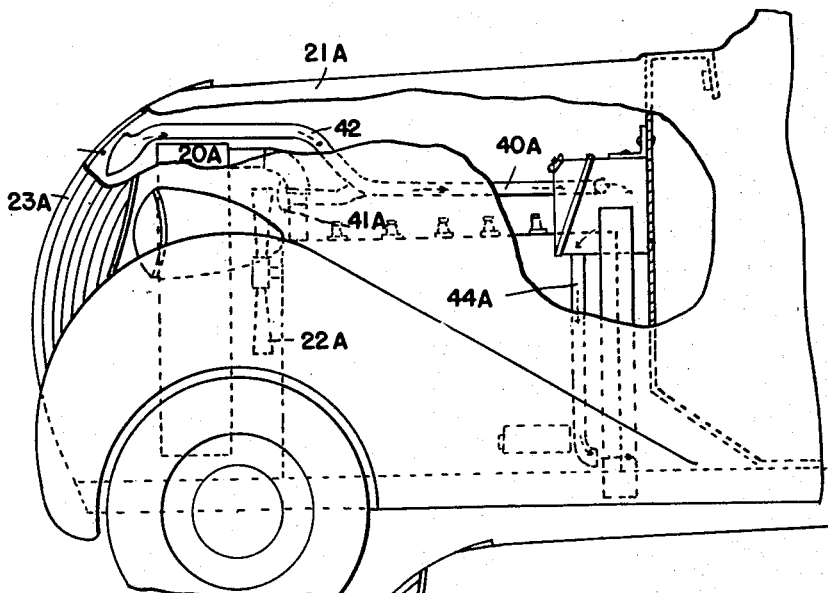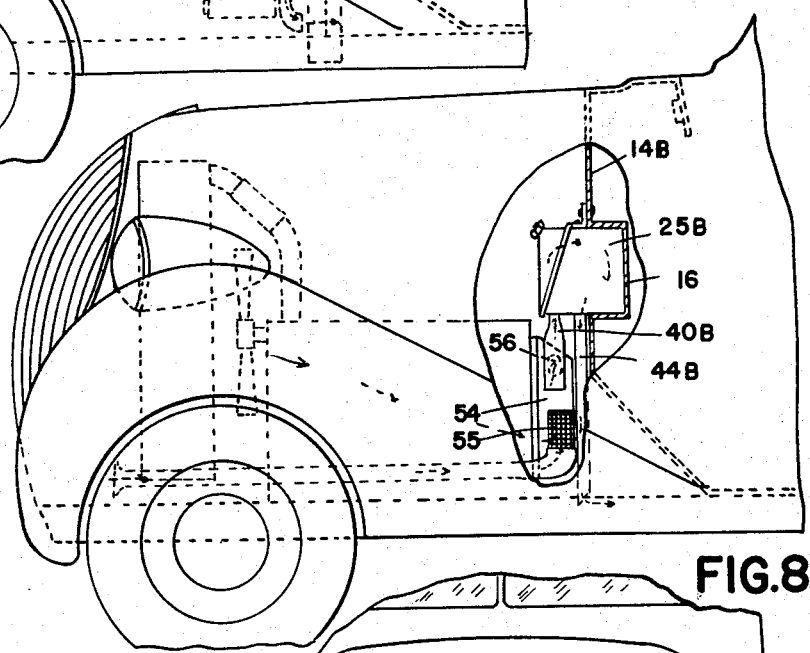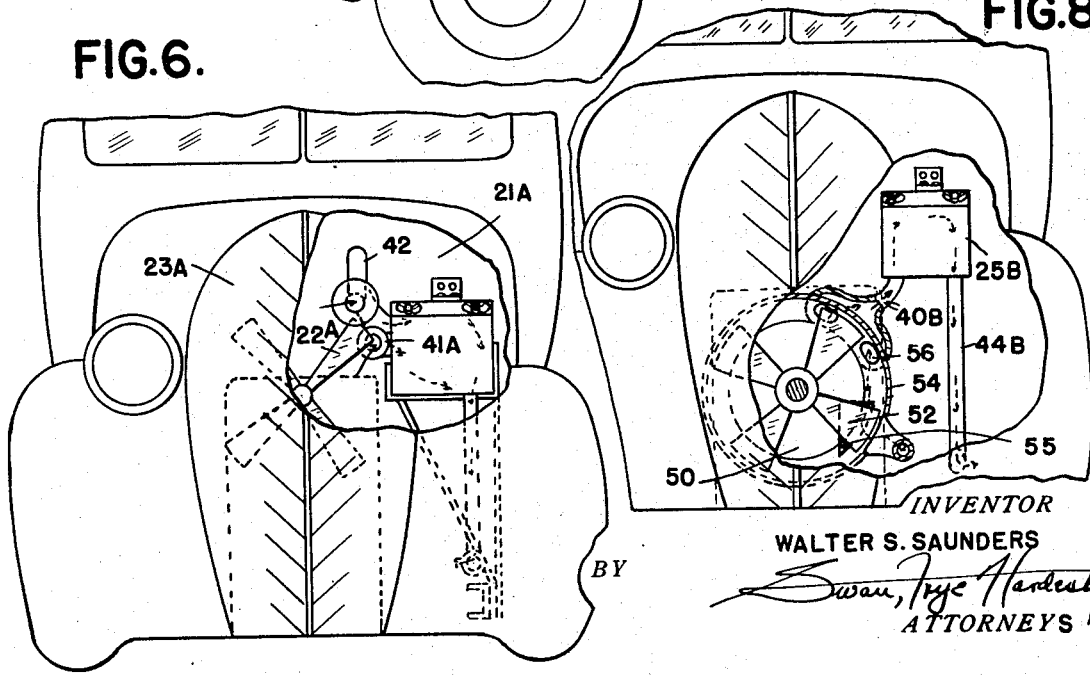

Patented Jan. 11, 1938

2,104,769

UNITED STATES PATENT OFFICE 2,104,769

STORAGE BATTERY INSTALLATION

Walter S. Saunders, Pontiac, Mich., assignor to The American Forging & Socket Company, Pontiac, Mich., a corporation of Michigan Application August 21, 1936, Serial No. 97,212

6 Claims. (Cl. 180—68.5)

This invention relates to the installation of storage batteries in automotive vehicles, and to the provision of improved means for supporting and ventilating such batteries. The invention constitutes an improvement upon the disclosure of my previously filed copending application, Serial Number 64,909 filed February 20, 1936.

A particular object comprises the provision of improved means for supplying air for cooling such batteries and for inducing forced draft air circulation.

A further object is to provide means whereby the storage battery may be located close to the engine, and directly in the engine compartment of the vehicle if desired, yet protected against the heat of the engine and ventilated by draft-inducing means operated partly or entirely by the engine itself and requiring no extra moving parts, or expensive or complicated construction in order to effect the desired forced circulation of air through the battery compartment.

Other objects and advantages will be apparent from the following description, wherein reference is made to the accompanying drawings illustrating a preferred embodiment of my invention, and wherein similar reference numerals designate similar parts throughout the several views.

Figure 1:
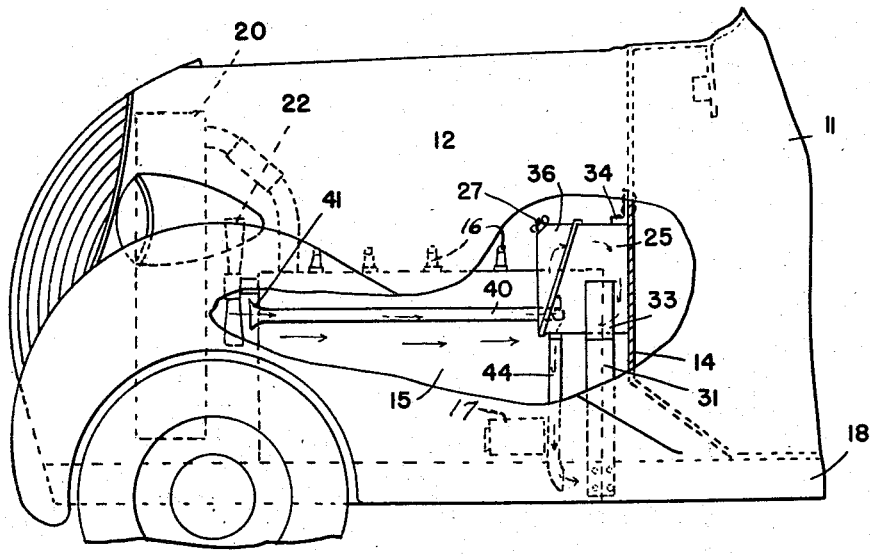
Figure 1 is a somewhat diagrammatic fragmentary side elevational view of the front portion of an automobile, showing a battery installation incorporating the principles of this invention.
Figure 2:
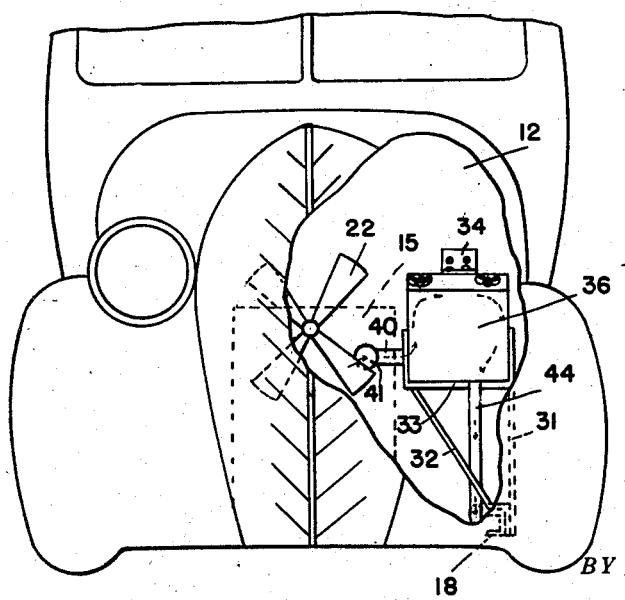
Figure 2 is a front elevational view of the same, partly broken away.

Figures 5 and 6 are fragmentary side and front elevational views, respectively, similar to Figures 1 and 2, of a somewhat modified structural embodiment of the invention, and Figures 7 and 8 are similar side and front elevational views respectively of an automotive battery installation constituting a further modification.

Referring now to the drawings: Reference character 11 designates the passenger compartment and 12 the engine compartment of an automobile, such compartments being separated by a dash panel 14. It will be appreciated that the front disposition of the engine 15 is illustrative merely, and that mounting thereof in other portions of the vehicle is within the contemplation of the invention. The framework of the vehicle includes side rails 18, and a radiator 20 and fan 22 adapted to induce a draft of air therethrough are arranged in front of the engine, in more or less conventional fashion. Appurtenant the engine are electrically operable elements including spark plugs 16 and the electric starter 17.

Figure 3:
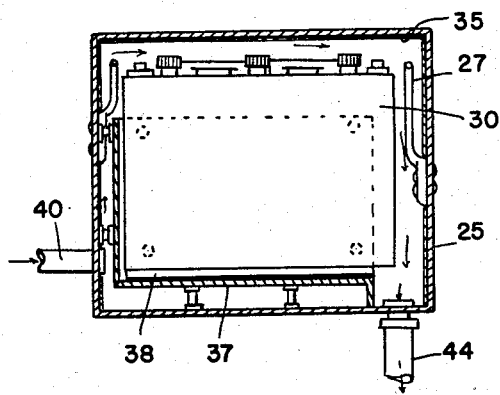
Figure 3 is a longitudinal sectional view of the battery box, showing in front elevation a battery arranged therein.
Figure 4:
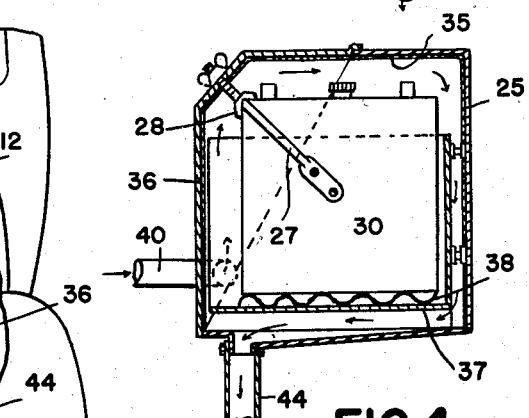
Figure 4 is a cross section of the battery box, showing the storage battery in end elevation.

A battery box 25 is arranged upon the dash panel 14 and extends forwardly beside the engine. Preferably the box is braced, and if desired supported entirely, from the frame element 18 by strap metal uprights as 31—32, the arrangement of which and the manner of securance thereof to the frame element 18 are best indicated in Figure 2. The uprights are secured to or continued to form a skeleton tray-like supporting portion 33, extending beneath and part way up the sides of the box 25. The box may also be attached to the dash panel by an angle bracket 34. The cover portion 36, forming the front and a portion of the top of the box, is secured thereto by bolts 27 which project angularly from the body portion and through the upper front corner of the cover, also carrying within the box the holding member formed of an angle iron 28 arranged to engage the front top corner of the battery to hold the same in place. The box preferably forms a tight enclosure, and may be insulated as well as protected against the fumes emanating from the battery by a lining as 35 of acid resisting material. Inlet and outlet openings (undesignated) are formed in the box near opposite ends thereof, and the battery 30 is supported in spaced relation to the bottom and sides by a combined supporting and baffle element 37, which forces air circulating through the box to travel up and over the battery to reach the outlet, as will be apparent from an inspection of Figures 3 and 4. Member 27 may also be corrugated as at 38 to provide air channels between itself and the battery.

A tube 40 is connected to the air inlet opening and extends forwardly to a position directly behind the fan 22 where it may be provided with a flared mouth 41 into which air is forced by the fan, while an outlet pipe 44 extends downwardly from the outlet opening to a position beneath the engine, and in the air induced thereabout by movement of the vehicle, which draft is of course assisted by the fan 22, the open end of the outlet conduit 44 being directed with the normal path of the air currents in such fashion that outflow therefrom is aided by the entraining action of such currents to assist air circulation within the box.

In order to avoid the use of air heated by passage through the radiator, or the entire use of such air, some or all of the inlet air may be taken from a position ahead of the radiator, in the embodiment shown in Figures 5 and 6, which illustrate a modification directed to this end, and in which parts analogous to those shown and described in the disclosure of the first embodiment have been given like numerals with the addition of the letter "A". Certain parts will accordingly need no detailed redescription. The radiator 20A will be seen to be located entirely inside the hood 21A and behind the ornamental grille 23A, and spaced therefrom sufficiently to allow the extension of a branch inlet pipe 42 over the radiator and to a position in front thereof and behind the grille 23. The branch inlet pipe 42 joins the inlet pipe 40A in a direction substantially parallel to the normal flow of air through the latter, a portion of the inlet pipe 40A being extended, as in the first described embodiment, to a position directly behind the fan 22A, where it is equipped with a mouth 41A into which air may be driven by the fan. The arrangement will be seen to be such that the flow through the pipe induced by the fan also assists in drawing air through the section 42, which if desired may be larger than the section connected to the mouth 41A, in order that the greater proportion of the air may be taken from the zone of unheated air forward of the radiator. The relative proportions of the inlet branches, however, will be seen to be a matter of choice, and if desired the mouth 41A may be eliminated entirely, and reliance placed upon the motion of the vehicle through the air for inducing air circulation through the box. As in the first embodiment, circulation is also assisted by the arrangement of the outlet conduit 44A, which extends to such a position in the air currents around the motor that the latter, flowing about the outlet thereof, assist the withdrawal of air from the box.

The modification of Figures 7 and 8 makes unnecessary the forward extension of tubes above or beside the motor. The battery is in this embodiment indicated as supported entirely by the dash, although this is a matter of choice, and partly housed in a pocket section as 16 pressed or otherwise formed in the dash. Carried by the flywheel 50 of the engine is a fan 52, and the flywheel housing 54 is provided with air inlet and outlet openings 55—56, the former preferably screened. To the air outlet, in suitable position to receive the air blast created by the fan, is connected the enlarged mouth of the air inlet tube 40B, which discharges the air into the battery box 25B in similar fashion to the delivery thereof in the previous embodiments, while the outlet conduit 44B discharges the air from the box into the air currents flowing past the motor, and with the assistance thereof, in like fashion.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

I claim:

1. In combination with an automotive vehicle incorporating electrically operable elements and including a frame, an engine compartment, a passenger compartment, an engine, radiator, and air circulating fan in the engine compartment, one or more of said electrically operable elements being appurtenant said engine, a storage battery for supplying current to said electrically operable elements, and means for supporting and ventilating said storage battery including a battery box having at least a portion thereof in but isolated from the engine compartment, said box having air inlet and outlet portions, and means defining a passage connected to the inlet portion and opening directly behind the fan, to direct into the box a part of the blast of the fan.

2. Apparatus as set forth in claim 1 including a branch conduit connected to said means defining a passage and extending to a position in the airstream over a portion of the vehicle away from the engine and radiator, to intercept and direct to the box air which has not previously been heated by the radiator or engine.

3. In combination with an automotive vehicle incorporating electrically operable elements and including a frame, an engine compartment, a radiator located in the engine compartment, hood and grille means enclosing the engine and covering and spaced from the radiator, one or more of said electrically operable elements being appurtenant the engine, a storage battery for supplying current to said electrically operable elements, and ventilated supporting means for said battery comprising a battery box having at least a portion thereof in but isolated from said engine compartment, said box having air inlet and outlet portions, and an inlet conduit connected to the inlet portion and extending between the hood and grille means and the radiator to a position forward of the radiator to intercept unheated air and direct the same to the box.

4. In combination with an automotive vehicle incorporating electrically operable elements and including a frame, an engine compartment, and a cooling radiator and air circulating fan for dissipating the excess heat of the engine, one or more of said electrically operable elements being appurtenant the engine, a storage battery for supplying current to said electrically operable elements, and ventilated supporting means for said battery comprising a battery box having at least a portion in but constituting an enclosure distinct from the engine compartment, said battery box having air inlet and outlet portions, air collecting conduit means connected to said inlet portion and extending to a position outside the engine compartment and away from the radiator to intercept unheated air and direct the same to the box, and means for inducing a forced draft of air through said conduit means, comprising a branch inlet connected thereto and having a mouth located behind said fan to intercept a portion of the blast therefrom.

5. In combination with an automotive vehicle incorporating electrically operable elements and including a frame, an engine compartment, an engine in said compartment, said engine having at one end thereof a flywheel driven thereby and a flywheel housing, one or more of said electrically operable elements being appurtenant said engine, a storage battery for supplying current to said electrically operable elements, and ventilated supporting means for said battery comprising a battery box having at least a portion located in but constituting an enclosure distinct from said engine compartment and arranged near said flywheel housing, said battery box having air inlet and outlet portions, a fan within said flywheel housing driven by said engine, and means for collecting a portion of the air blast from said fan and for delivering the same to the box.

6. Means as set forth in claim 5 including conduit means connected to said outlet portion and discharging at a point in the air stream of the vehicle outside said flywheel housing.

WALTER S. SAUNDERS.